United States Patent
Cheng et al.

(10) Patent No.: US 7,254,411 B2
(45) Date of Patent: Aug. 7, 2007

(54) WIRELESS DATA COMMUNICATION METHOD

(75) Inventors: Kuang-Ting Cheng, Kaoshion (TW); Chih-Hsin Lee, Kingning township, Kingmen County (TW)

(73) Assignee: Benq Corporation, Taoyuan (TW)

( * ) Notice: Subject to any disclaimer, the term of this patent is extended or adjusted under 35 U.S.C. 154(b) by 88 days.

(21) Appl. No.: 10/949,649

(22) Filed: Sep. 24, 2004

(65) Prior Publication Data
US 2006/0068814 A1 Mar. 30, 2006

(51) Int. Cl.
*H04Q 7/20* (2006.01)
(52) U.S. Cl. .................... 455/466; 455/412.2
(58) Field of Classification Search ............. 455/466, 455/412.2, 522, 574, 343, 415
See application file for complete search history.

(56) References Cited

U.S. PATENT DOCUMENTS

| 6,226,533 | B1 * | 5/2001 | Akahane ............... 455/566 |
| 6,978,149 | B1 * | 12/2005 | Morelli et al. ............ 455/522 |
| 7,013,155 | B1 * | 3/2006 | Ruf et al. ................ 455/466 |
| 2004/0137890 | A1 * | 7/2004 | Kalke ..................... 455/418 |
| 2004/0157590 | A1 * | 8/2004 | Lazaridis et al. .......... 455/415 |
| 2005/0154759 | A1 * | 7/2005 | Hofmeister et al. ...... 707/104.1 |

FOREIGN PATENT DOCUMENTS

| CN | 1170484 | 1/1998 |
| TW | 526645 | 9/1990 |
| TW | 200412084 | 12/1991 |
| WO | WO2004025974 | 3/2004 |

OTHER PUBLICATIONS

China Office Action mailed Feb. 2, 2007.
China Office Action mailed Mar. 20, 2007.

* cited by examiner

*Primary Examiner*—CongVan Tran
(74) *Attorney, Agent, or Firm*—Thomas, Kayden, Horstemeyer & Risley

(57) ABSTRACT

A data communication method for information exchange in a wireless communication system. Various types of information are stored in a database according to a predefined format, and transmitted during voice communication using an EMS message. The corresponding database of the receiver is then updated automatically according to the received EMS message.

20 Claims, 4 Drawing Sheets

| SMS Header (Phone Numbers, Date/Time) | User Data Header (EMS Media) | | | Text (up to 160 characters) |
|---|---|---|---|---|
| | Sound | Picture | Predefined Animation | |

FIG. 1

| Type of database | Number of data fields | Length of each data field | Data field 1 | Data field 2 | Data field 3 |
|---|---|---|---|---|---|

FIG. 3

WIRELESS DATA COMMUNICATION METHOD

BACKGROUND

The invention relates to wireless data communication, and more specifically, to simultaneous data and voice communication via a wireless communication system.

Wireless communication systems are constantly evolving. System designers are continually developing greater numbers of features for both service providers and users. Cellular based phone systems, for example, have advanced tremendously in recent years. Among various features available in the wireless phone systems, Short Message Service (SMS) is one of the most popular functions. SMS is a point to point, or point to multi-point service that enables users to exchange text messages over a communications network. Receipt notification, wherein the receiving station returns an acknowledgement, indicating that the message has been delivered is included in the service. SMS communication, however, is not "real time", that is, messages are exchanged independently of each other, and as such, SMS communication does not require the establishment of a simultaneously contiguous end-to-end traffic path. A typical SMS system includes user terminals as the initiators or final destinations for messages, a Short Message Service Center (SMSC), which serves as a relay for messages among terminals throughout the network, and the network itself serving as the communications medium for the messages. The Short Message Transfer Protocol (SMTP), including various lower layer protocols, manages the transfer of messages among terminals.

An SMS message is initially sent by an SMS capable terminal (i.e. a mobile station) via the communications network, and is received and stored by the SMSC. The SMSC determines if the intended destination of the SMS message is available to the network, and if so, the message is then sent to that destination. Whenever an SMS capable terminal is registered to a network, it is capable of exchanging SMS messages, even when the terminal is engaged in a voice or data call. If the intended destination is not available, or does not acknowledge delivery, the SMSC may then initiate any number of message handling routines including re-transmitting the message at periodic intervals or even discarding the message.

Enhanced Messaging Service (EMS) is an application-level extension to SMS for cellular phones available on Global Systems for Mobile communications (GSM), Time Division Multiple Access (TDMA), and Code Division Multiple Access (CDMA) networks. An EMS-enabled mobile phone can send and receive messages that have special text formatting (such as bold or italic), animations, pictures, icons, sound effects, and special ring tones. EMS messages that are sent to devices that do not support EMS will be treated as SMS transmissions. The EMS standard was defined by 3GPP ($3^{rd}$ Generation Partnership Project), the same standardization body from which the worldwide success of GSM and the standardization of SMS originated. It is a completely open standard that may be supported by any manufacturer in the interests of interoperability between consumers. The EMS has been standardized by extending the use of User Data Header (UDH) in the SMS standard. FIG. 1 shows an EMS message schema, wherein all the media is stored in the UDH, while the text is stored in the normal text area of the short message.

SUMMARY

An embodiment of the invention provides a method of data communication between a first and a second device in a wireless communication network. The method comprises retrieving an information set from a database of the first device, and encoding the information set into a message with a predefined packet format, wherein the information set is selected by depressing a hot key. Preferably, the message is an enhanced messaging service (EMS) message transmitted over a stand alone dedicated control channel (SDCCH) or a slow associated control channel (SACCH). The message is then transmitted to a short message service centre (SMSC), and forwarded to the second device. The second device receives and decodes the message, and the user determines whether to accept the message to update the corresponding database. If the user accepts the message, the message is stored in the database, thus the database can be updated accordingly. Consequently, the second device displays an alert message informing the user that the database has been updated.

The set of information is selected and constructed from a plurality of information stored in the database of the first device according to a security level or a type of information the user of the first device wishes to send to the user of the second device. The first device has at least two hot keys, where each hot key corresponds to the security level or type of information for the user to choose. The set of information retrieved from the database comprises one or any combination of a user name, personal identification number (PIN), email, photo, date of birth, voice message, phone number, address, company name, image, planned schedule, time, location, and event.

The first and second devices are capable of simultaneously processing data and voice communication. The message is transmitted over a traffic channel (TCH) utilizing a stealing flag mechanism, whereby the message is transmitted in discontinuous transmission (DTX) periods during voice communication.

The message comprises data fields and header fields, wherein the data fields store the set of information retrieved from the database, and the header fields define a database type, a total number of the data fields in the message, and a length of each data field.

BRIEF DESCRIPTION OF THE DRAWINGS

The invention can be more fully understood by reading the subsequent detailed description in conjunction with the examples and references made to the accompanying drawings, wherein:

FIG. 1 shows the short message (EMS) schema.

FIG. 3 shows the packet format of an exemplary short message.

DETAILED DESCRIPTION

Figure 2:
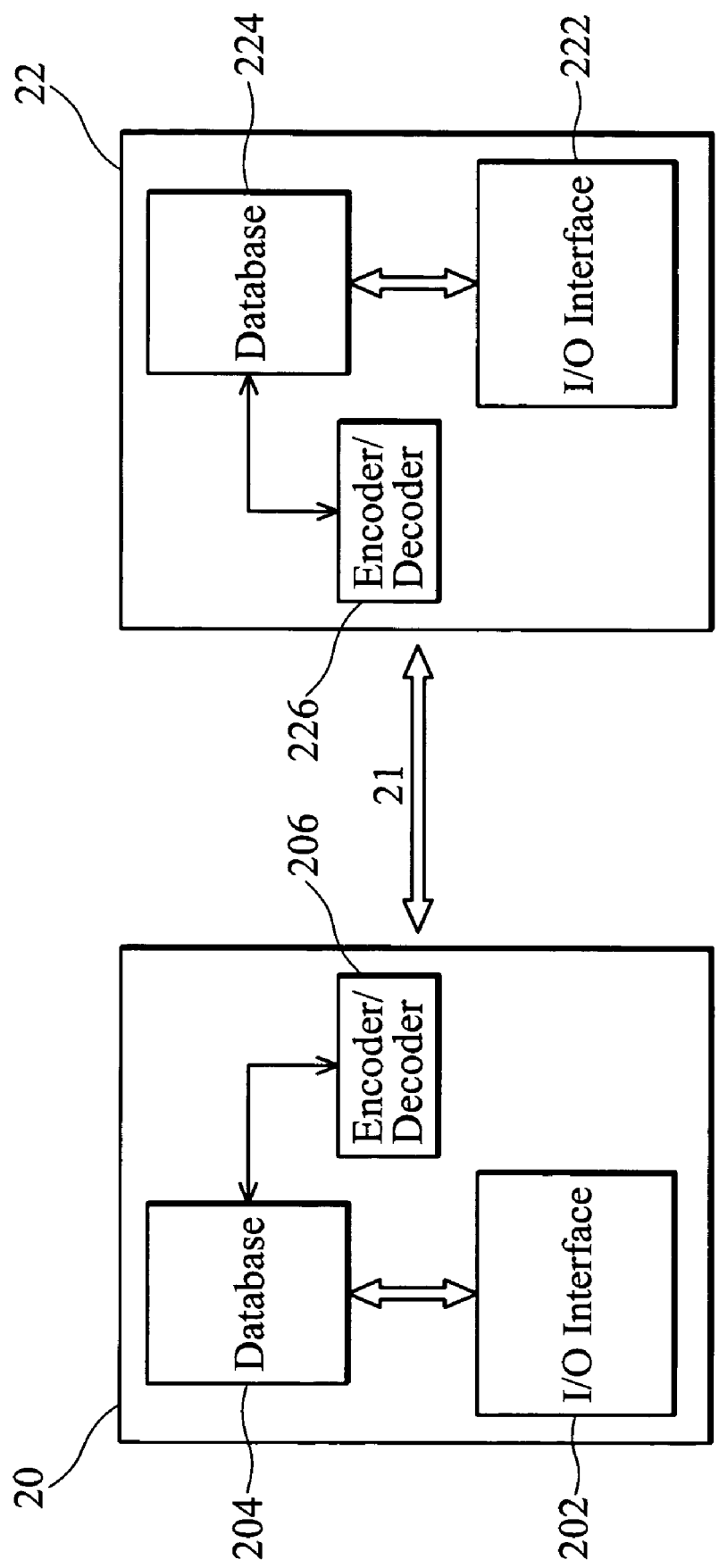
FIG. 2 is a simplified block diagram illustrating the wireless communication system.

Information such as name, date of birth, email, phone number, address stored in the database of a first device can be selected and sent to a second device by simply depressing a hot key. The selected information is encoded in an EMS message, and can be transmitted during a phone call. The EMS message is then received by the second device, and the information in the EMS message is automatically stored in the corresponding database of the second device. The security level or type of information for each transmission can be individually selected by the user, for example, if the selected security level is basic, "name" and "phone number" of the user will be sent, if it is medium, "name", "phone number", "date of birth", and "email" of the user will be sent, and if it is advanced, all the detailed information of the user will be sent to the destination device.

The database can be an address book or a scheduling calendar. The user of the first device is capable of setting or updating the address book or scheduling calendar stored in the second device by sending a short message, and vice versa. In case of updating the address book, the short message may comprise name, address, email, phone number, and date of birth, and in the case of updating the calendar, the short message may comprise a date, time, location, and brief description corresponding to a specific event the user of the first device wishes to inform the user of the second device of. The user of the second device may choose to accept or reject the incoming message to be stored in his/her database by depressing a corresponding hot key. The database of the second device is updated according to the received message once the user chooses to add the new information into his/her database. The proposed data communication method is a value added service for wireless communication systems, since it allows users update other users address books or calendars in a very simple and user friendly way, thus simplifying the input operations required at both ends. For example, a user may invite or remind multiple users about the incoming event by simply selecting an event recorded in his/her calendar, and sending a corresponding message comprising the date, time, location, and brief description of the event to the desired recipients. Since the EMS message supports multimedia data, an image of the location can be sent, and a special ring tone can be attached to the message. Parents for example can send a message to update the calendar of a child reminding them to do a certain activity at a certain time, or a secretary can update the schedule of a superior.

The described data communication method can be realized by enhancing current software conforming to existing communication protocols, so that the procedures for data transmission and database updates becomes more convenient for users. The information carried by the received message can be recognized by the database and automatically stored in an appropriate format, which reduces the need for manual input.

FIG. 2 is a simplified block diagram showing a system structure according to an embodiment of the invention. The system comprises a first device 20 and a second device 22 connecting via a wireless communication network. The two devices 20 and 22 can be any wireless devices such as a mobile phone, personal digital assistant (PDA), or notebook computer. The devices 20 and 22 comprise input/output (I/O) interfaces 202 and 222, databases 204 and 224, and encoders/decoders 206 and 226. When the user of the first device 20 wishes to send information retrieved from the database 204 to the second device 22, the user utilizes the I/O interface 202 to select the information. The I/O interface 202 can be implemented using a touch screen or a keypad, and the type of information and transmission setting is selected by touching the corresponding region on the touch screen or depressing the corresponding hot key on the keypad. As previously described, the type of information can be classified according to a security or privacy level, which can be predefined by the user.

The database 204 and 224 may store various types of information, for example, personal information such as name, phone number, date of birth, email, address, personal identification number (PIN), company name, scheduling information such as planned date, time, location, and description of the event, and other multimedia information represented by photo, voice message, or image. In order to support various information types, an enhanced messaging service (EMS) message or a multimedia messaging service (MMS) message are more employed for delivering such information. The databases 204 and 224 are capable of analyzing the information carried by the message, and updating accordingly.

The information retrieved from the database 204 is then encoded by the encoder/decoder 206 to yield a message with a predefined packet format. An exemplary packet format of the message is illustrated in FIG. 3, the first three fields are referred to as header fields, which store the type of database (such as address book or scheduling calendar), a total number of data fields (such as 3 in this example), lengths for each data field, and followed by three data fields.

As shown in FIG. 2, the message is then transmitted over a wireless channel 21 to the second device 22. The wireless channel 21 maybe a stand alone dedicated control channel (SDCCH) or a slow associated control channel (SACCH) used for EMS transmission. A stealing flag mechanism is, however, proposed as an alternative for the message transmission according to an embodiment of the invention. The stealing flag mechanism is similar to a fast associated control channel (FACCH) which is used to transmit control messages. The stealing flag mechanism allows the messages to be sent during discontinuous transmission (DTX) periods in a traffic channel (TCH). The proposed stealing flag mechanism establishes a more rapid transmission connection during voice communication when compared to the SDCCH and SACCH. When engaged in voice communication, the user end is idle roughly 50% of time (while listening for example). This idle time is referred to as a discontinuous transmission (DTX) period. During the DTX period, the TCH does not send data, thus the message can be sent. The device enters the DTX mode to reduce power consumption, and the device returns to the DTX mode immediately after sending the message.

The encoder/decoder 226 of the second device decodes the received message, and the I/O interface 222 informs the user about this message. The database 224 is then updated according to the message once the user chooses to accept it.

Figure 4:
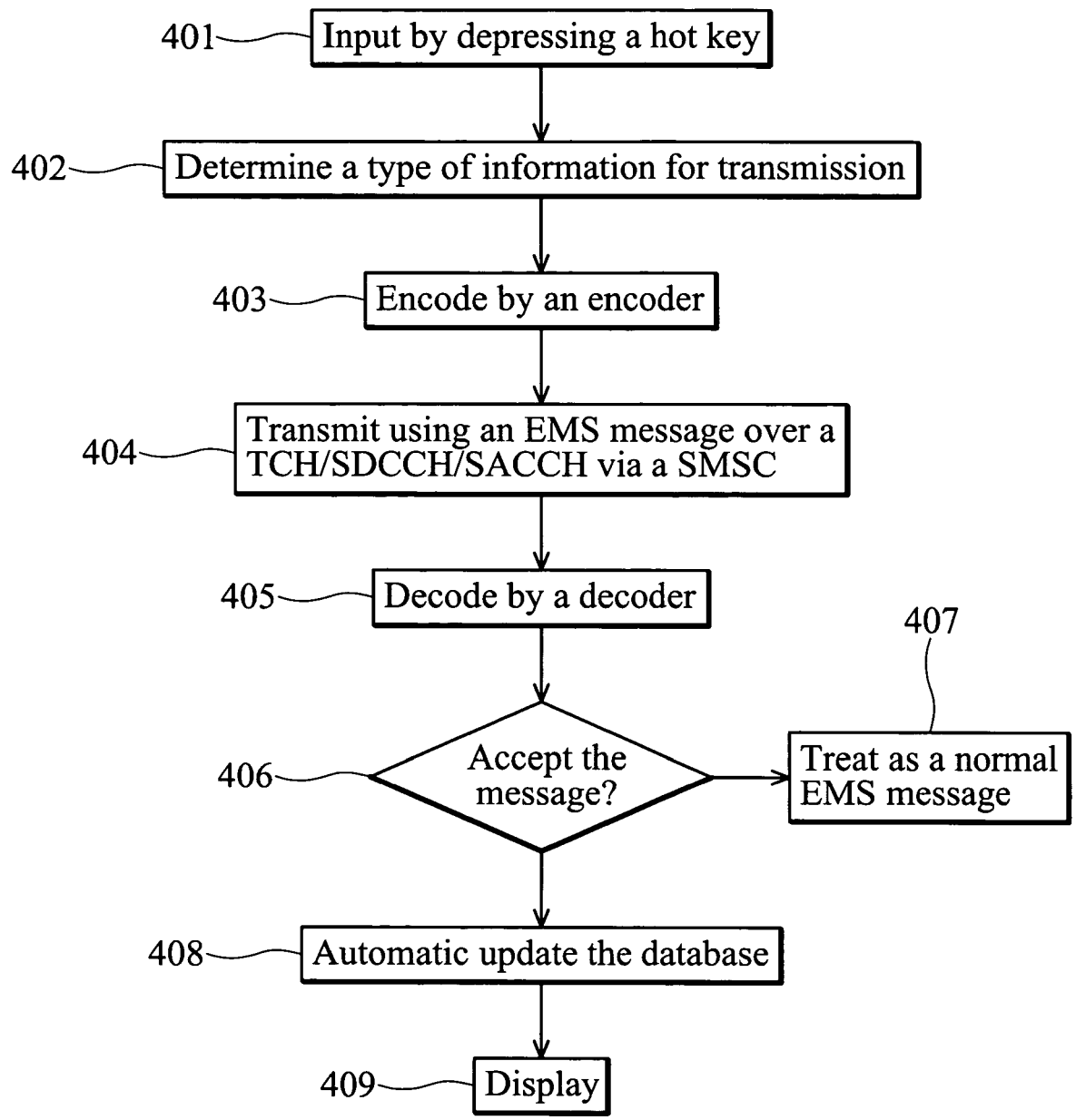
FIG. 4 is a flowchart illustrating the data communication method.

The provided data communication method is illustrated in FIG. 4. Steps 401~403 are performed in the transmitter, steps 405~409 are performed in the receiver. The user of the transmitter first depresses a hot key to initiate the data transmission in step 401, and then selects an information type to be transmitted in step 402. The information is encoded and carried in an EMS message in step 403. The EMS message is transmitted to a short message service center (SMSC) over a TCH using the stealing flag mechanism while the user is engaged in voice communication, else the EMS message can be transmitted to the SMSC via the conventional SDCCH or SACCH (step 404). The SMSC then forwards the message to the receiving end. At the receiving end, the receiver decodes the message using a decoder in step 405, and updates the corresponding database automatically if the user accepts the received message (steps 406, 408) by depressing a hot key, else it treats the message as a normal short message (step 407). Finally, the screen of the receiver displays relevant information to inform the user that the database has been successfully updated. The disclosed data communication method can be attained by depressing a few hot keys, whereas conventionally, the user must manually update the database (word by word) according to the received short message. Therefore, the data communication method of the invention can reduce the complexity and time required for information exchange and database updates.

While the invention has been described by way of example and in terms of preferred embodiment, it is to be understood that the invention is not limited thereto. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method of data communication between a first and a second device in a wireless communication network, comprising:
    retrieving a set of information from a database of the first device for encoding into a message with a predefined packet format;
    transmitting the message from the first device to the second device;
    receiving the message and decoding the message by the second device; and
    updating a database of the second device according to the decoded message, wherein the set of information is selected and constructed from a plurality of information stored in the database of the first device according to a security level or a type of information the user of the first device wishes to send to the user of the second device.

2. The data communication method according to claim 1, wherein the database of the second device is updated according to the message if the user accepts the update.

3. The data communication method according to claim 2, wherein the user accepts the update by depressing a hot key on the second device.

4. The data communication method according to claim 1, wherein the first device has at least two hot keys, each corresponding to a selectable security level or type of information for the first device for transmission to the second device.

5. The data communication method according to claim 1, wherein the set of information retrieved from the database comprises one or any combination of a user name, personal identification number (PIN), email, photo, date of birth, voice message, phone number, address, company name, image, planned schedule, time, location, and event.

6. The data communication method according to claim 1, wherein the first and second devices are capable of simultaneously processing the voice and data communication.

7. The data communication method according to claim 6, wherein the message is transmitted over a traffic channel (TCH) utilizing a stealing flag mechanism, where the message is transmitted in discontinuous transmission periods.

8. The data communication method according to claim 1, wherein the message is transmitted from the first device to the second device via a short message service center (SMSC).

9. The data communication method according to claim 1, wherein the message is an enhanced messaging service (EMS) message, and the message is transmitted over a stand alone dedicated control channel (SDCCH) or a slow associated control channel (SACCH).

10. The data communication method according to claim 1, wherein the message comprises at least one data field and a plurality of header fields, the data field stores data in the set of information retrieved from the database, and the header fields define a type of information carried in the message, a total number of data fields in the message, and a length of each data field.

11. The data communication method according to claim 1, further comprising the second device displaying an alert message indicating that the database of the second device has been updated.

12. The data communication method according to claim 1, wherein the set of information being selected from a plurality of information stored in the database of the first device.

13. The data communication method according to claim 1, wherein the set of information is selected and constructed according to a security level or a type of information.

14. A method of data communication between a first and a second device in a wireless communication network, comprising:
    retrieving a set of information from a database of the first device for encoding into a message with a predefined packet format;
    transmitting the message from the first device to the second device during a voice communication between the first and second device;
    receiving the message and decoding the message by the second device; and
    updating a database of the second device according to the decoded message.

15. The data communication method according to claim 14, wherein the message is transmitted over a traffic channel (TCH) utilizing a stealing flag mechanism, where the message is transmitted in discontinuous transmission periods during voice communication.

16. The data communication method according to claim 14, wherein the set of information is selected and constructed from a plurality of information stored in the database of the first device according to a security level or a type of information.

17. The data communication method according to claim 14, wherein the set of information retrieved from the database comprises one or any combination of a user name, personal identification number (PIN), email, photo, date of birth, voice message, phone number, address, company name, image, planned schedule, time, location, and event.

18. A method of data communication between a first and a second device in a wireless communication network, comprising:
retrieving a set of information from a database of the first device for encoding into a message with a predefined packet format, the set of information is selected and constructed from a plurality of information stored in the database of the first device according to a security level or a type of information;
transmitting the message from the first device to the second device;
receiving the message and decoding the message by the second device; and
updating a database of the second device according to the decoded message, wherein the first device has at least two hot keys, each corresponding to a selectable security level or type of information for the first device for transmission to the second device.

19. The data communication method according to claim 18, wherein the set of information retrieved from the database comprises one or any combination of a user name, personal identification number (PIN), email, photo, date of birth, voice message, phone number, address, company name, image, planned schedule, time, location, and event.

20. The data communication method according to claim 18, wherein the message is transmitted during a voice communication between the first and the second device.

* * * * *